United States Patent

[11] 3,634,648

[72] Inventors Thomas B. Morris
  Montgomery;
  Fred Paul, Prattville; Barney R. Powell,
  Montgomery, all of Ala.
[21] Appl. No. 5,200
[22] Filed Jan. 23, 1970
[45] Patented Jan. 11, 1972
[73] Assignee Standard Forge Axle Company,
  Incorporated
  Montgomery, Ala.

[54] APPARATUS FOR WELDING FLANGES
  26 Claims, 16 Drawing Figs.
[52] U.S. Cl. .................................................. 219/125 R,
  219/60, 219/159, 228/45
[51] Int. Cl. ...................................................... B23k 9/12
[50] Field of Search ............................................ 219/124,
  125, 60, 61, 107, 62, 159, 8, 160, 161; 228/48;
  188/250

[56]       References Cited
      UNITED STATES PATENTS
1,550,651  8/1925  Charter .................... 219/124
1,865,548  7/1932  Whitworth ................ 188/250
1,977,916  10/1934  Nelson ..................... 188/250
2,041,461  5/1936  Floyd et al. ............... 219/117
2,664,843  1/1954  Turner ..................... 219/159 X
2,753,826  7/1956  Dougherty ............... 228/48
2,768,281  10/1956  McDaniel ................. 219/159 X
3,255,336  6/1966  Purcell .................... 219/159

Primary Examiner—J. V. Truhe
Assistant Examiner—L. A. Schutzman
Attorney—Mason, Fenwick & Lawrence ABSTRACT: An apparatus for welding a flange about the periphery of a cylindrical member generally including a frame assembly, mounting means rotatably mounted on the frame assembly, means for detachably securing the cylindrical member to the mounting means for rotation therewith about the axis of the cylindrical member, the mounting means including means for securing the flange thereto in a predetermined position relative to the cylindrical member, welding means mounted on the frame assembly, directed toward adjacent portions of the flange and cylindrical member when the flange and cylindrical member are mounted on the mounting means for rotation therewith integrally, means for rotating the mounting means with the flange and cylindrical member secured thereto and means for energizing the welding means.

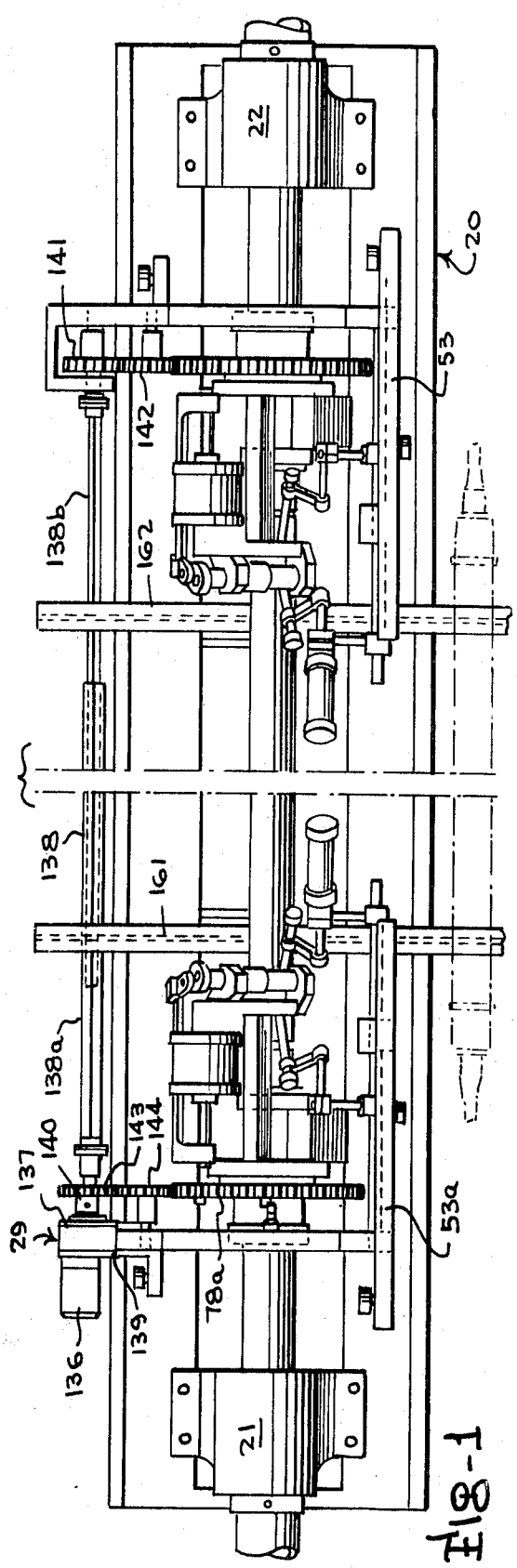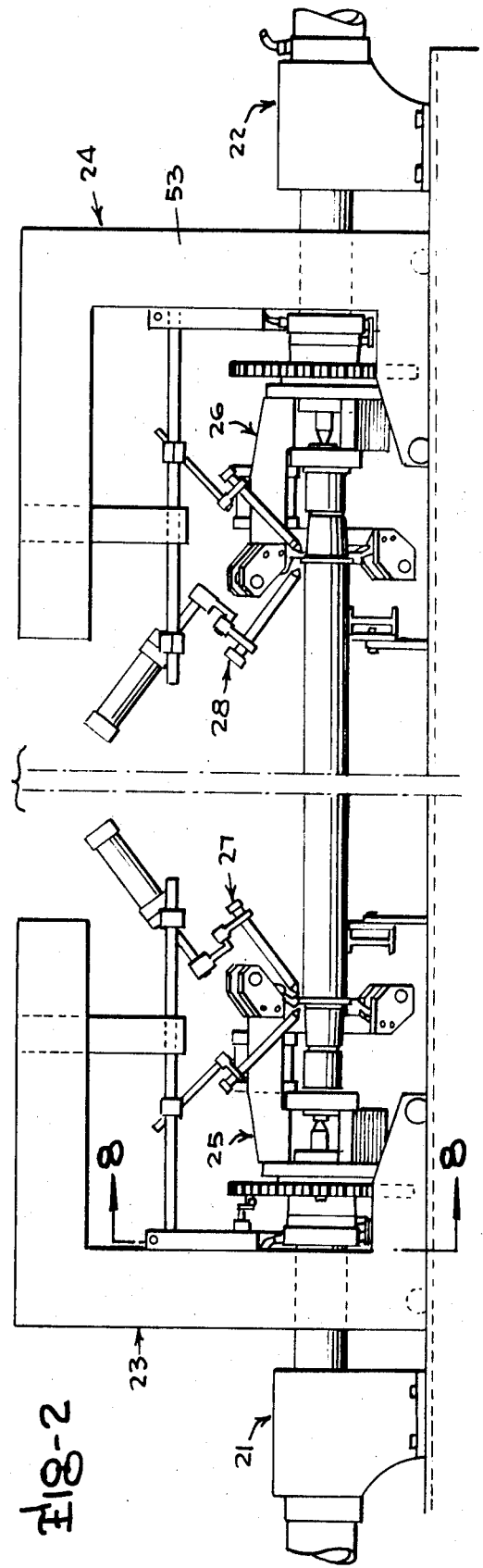

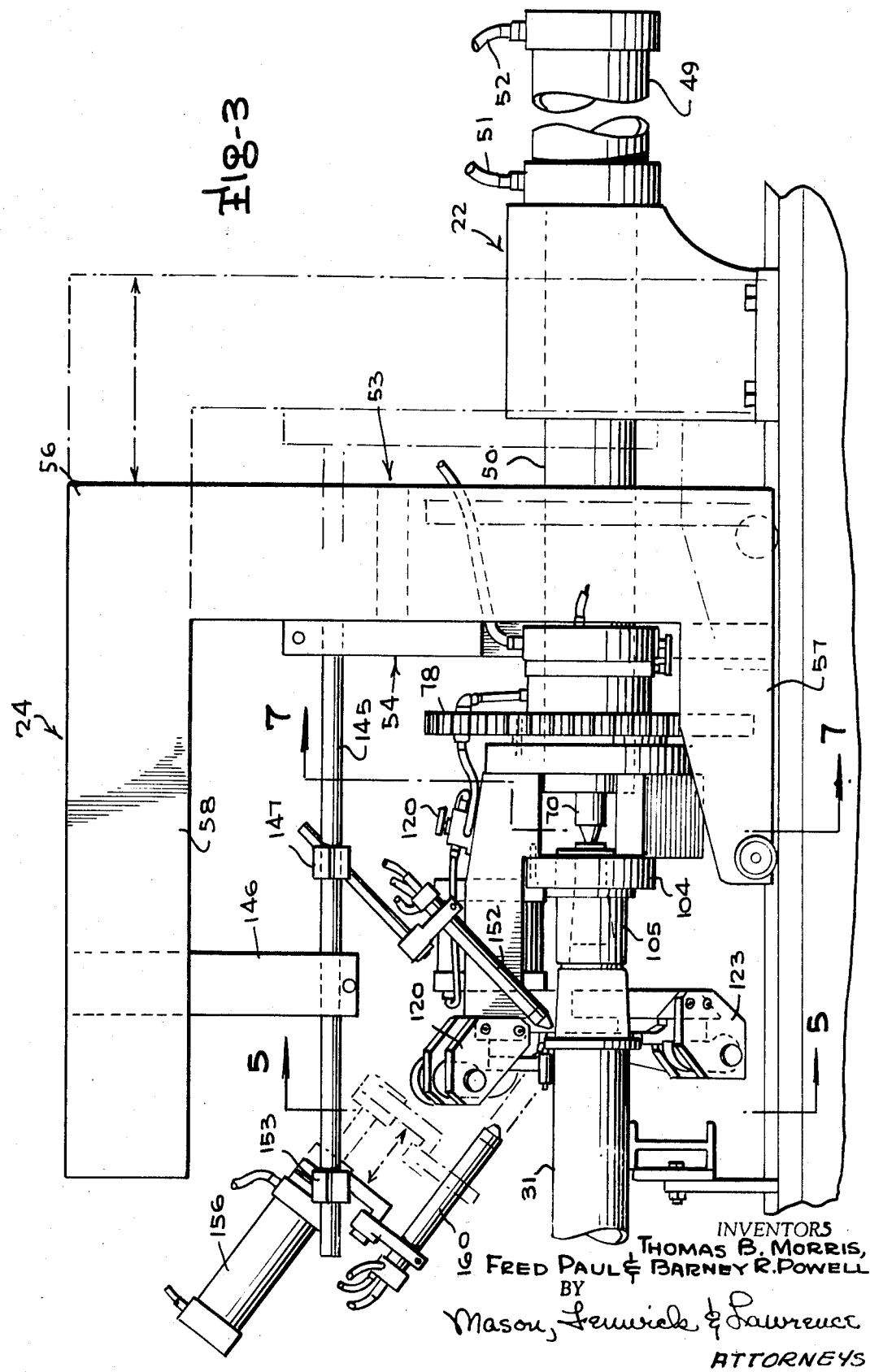

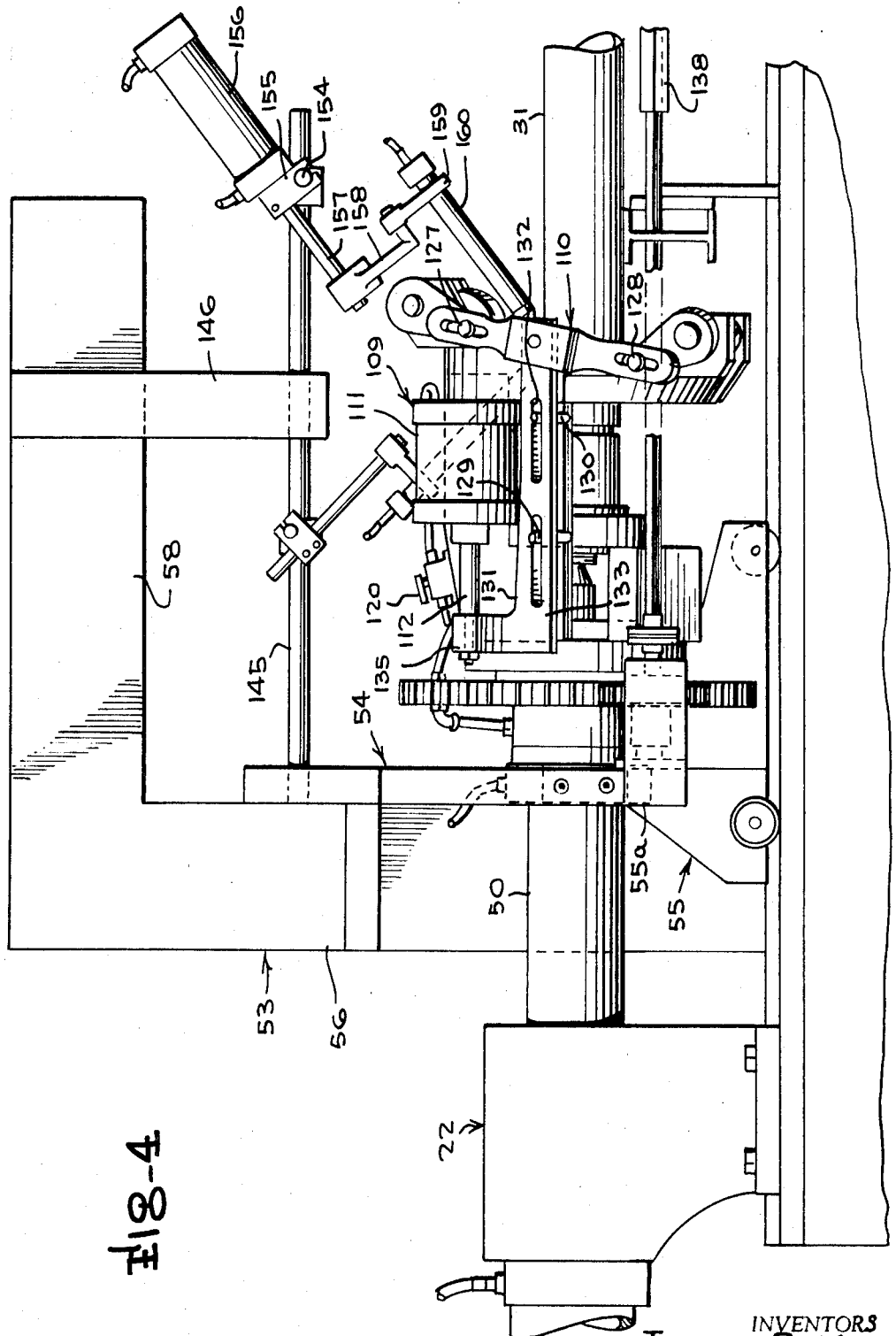

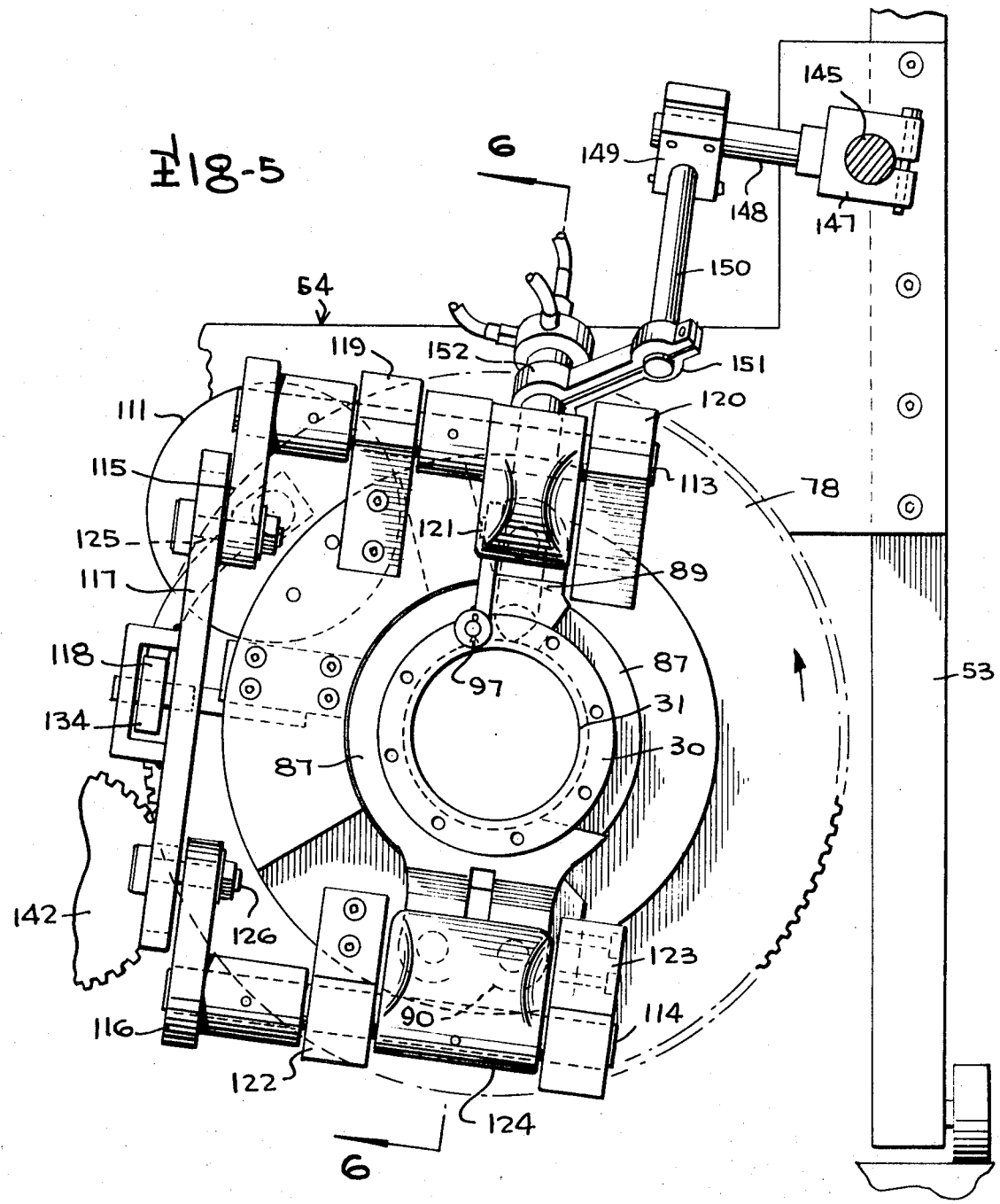

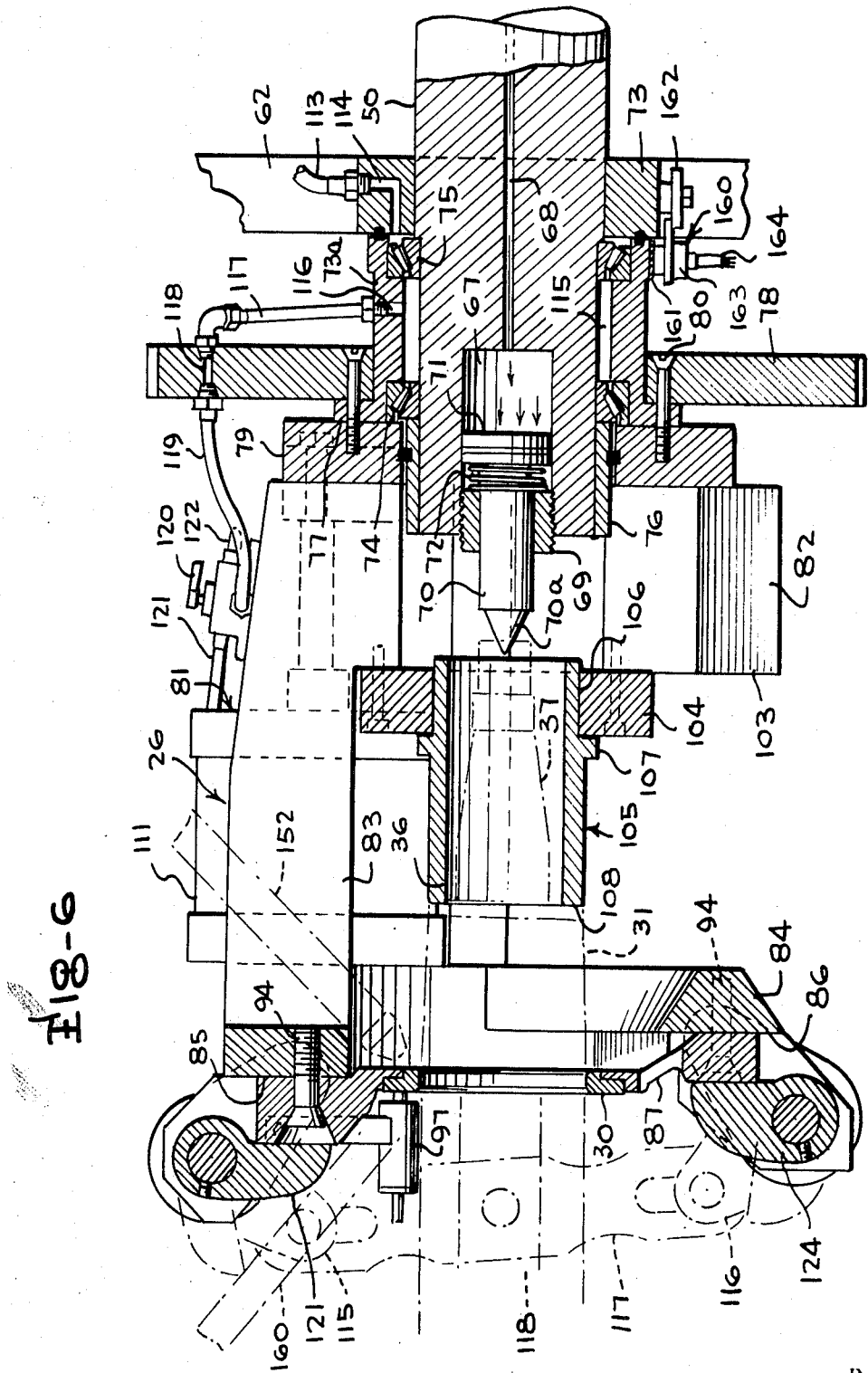

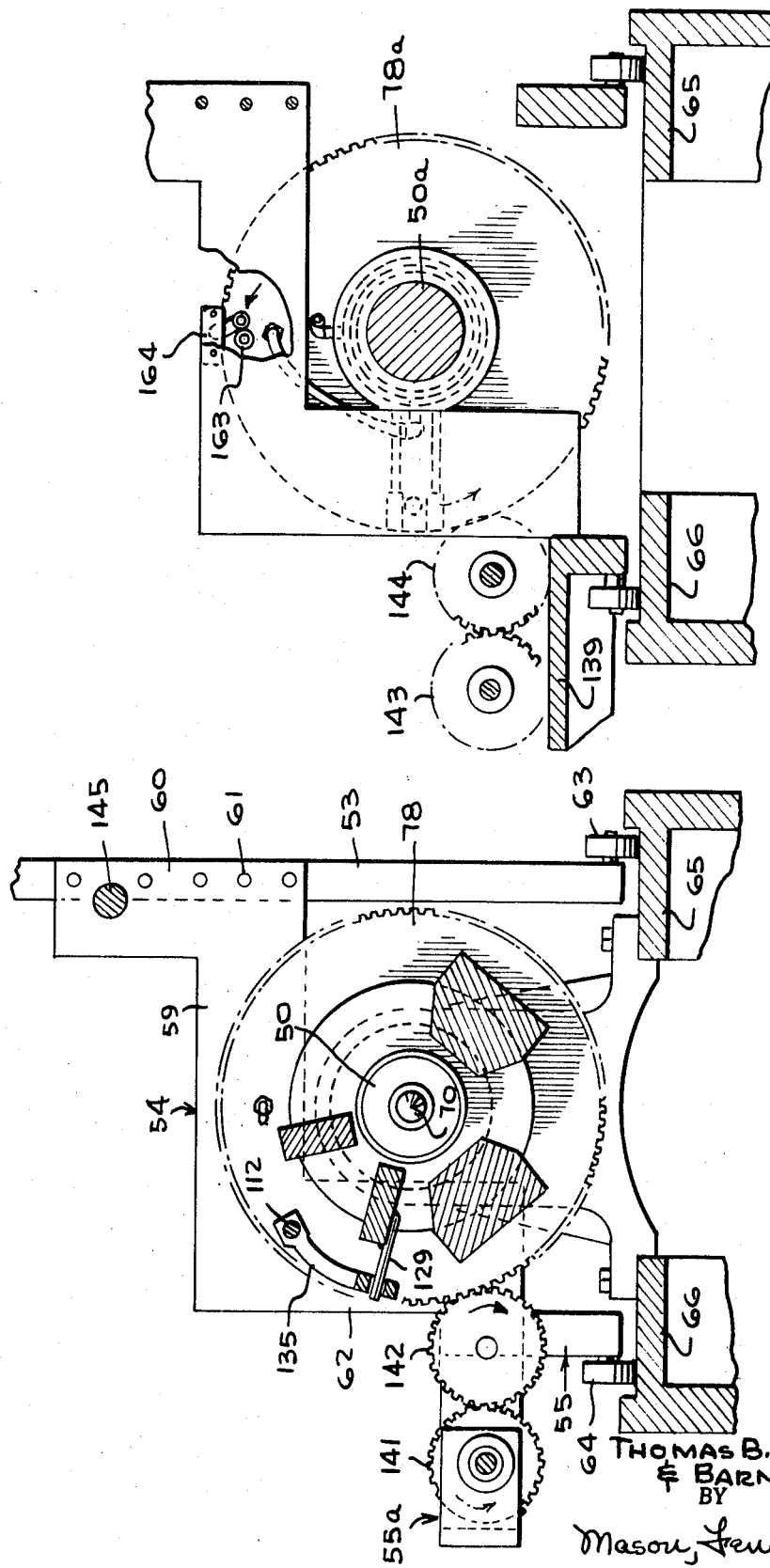

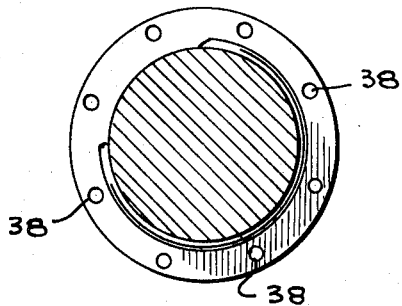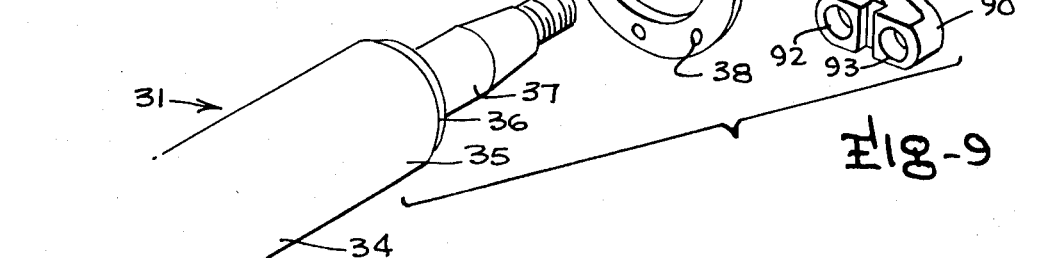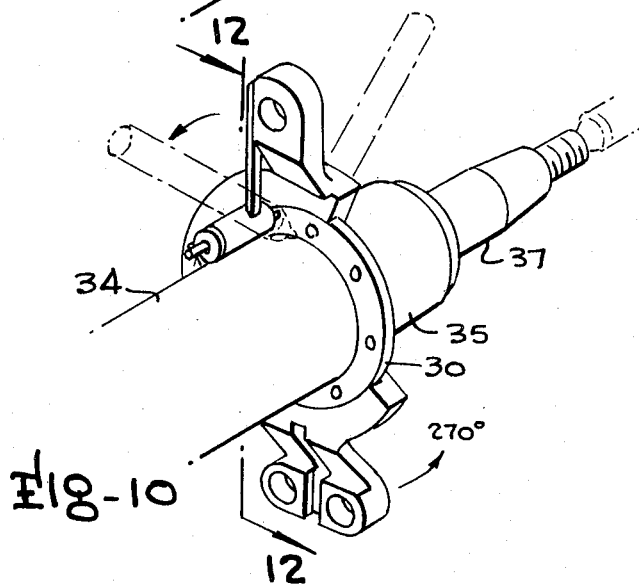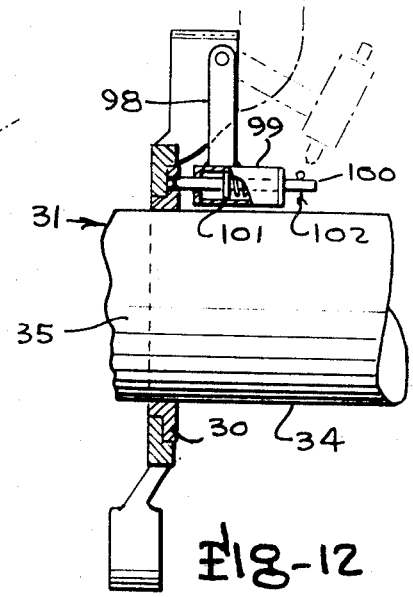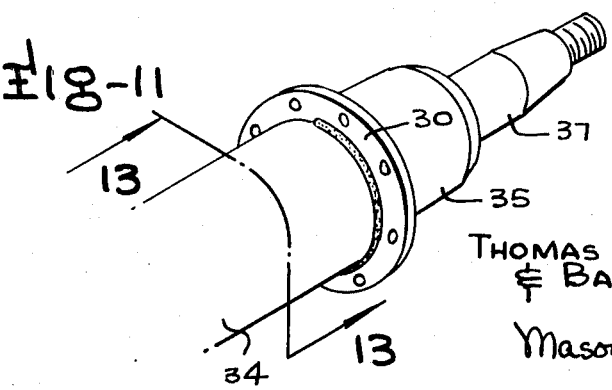

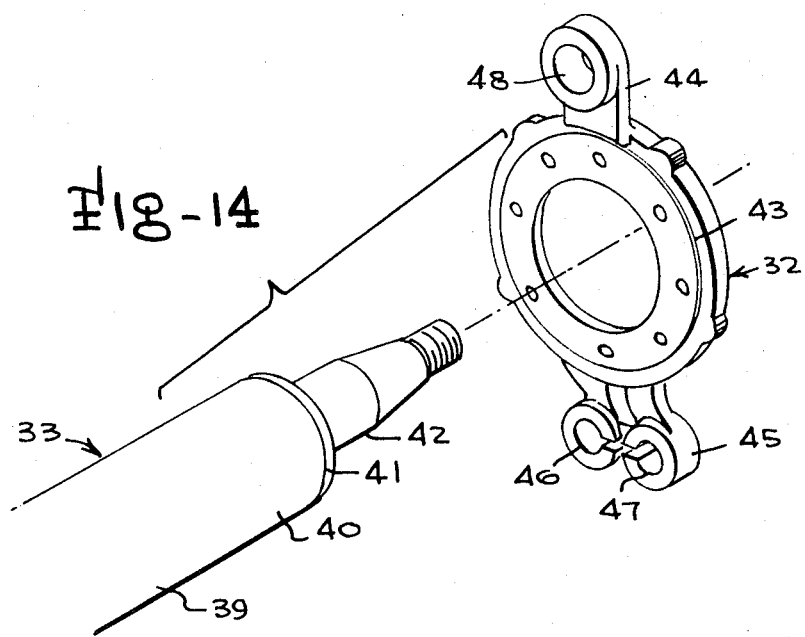
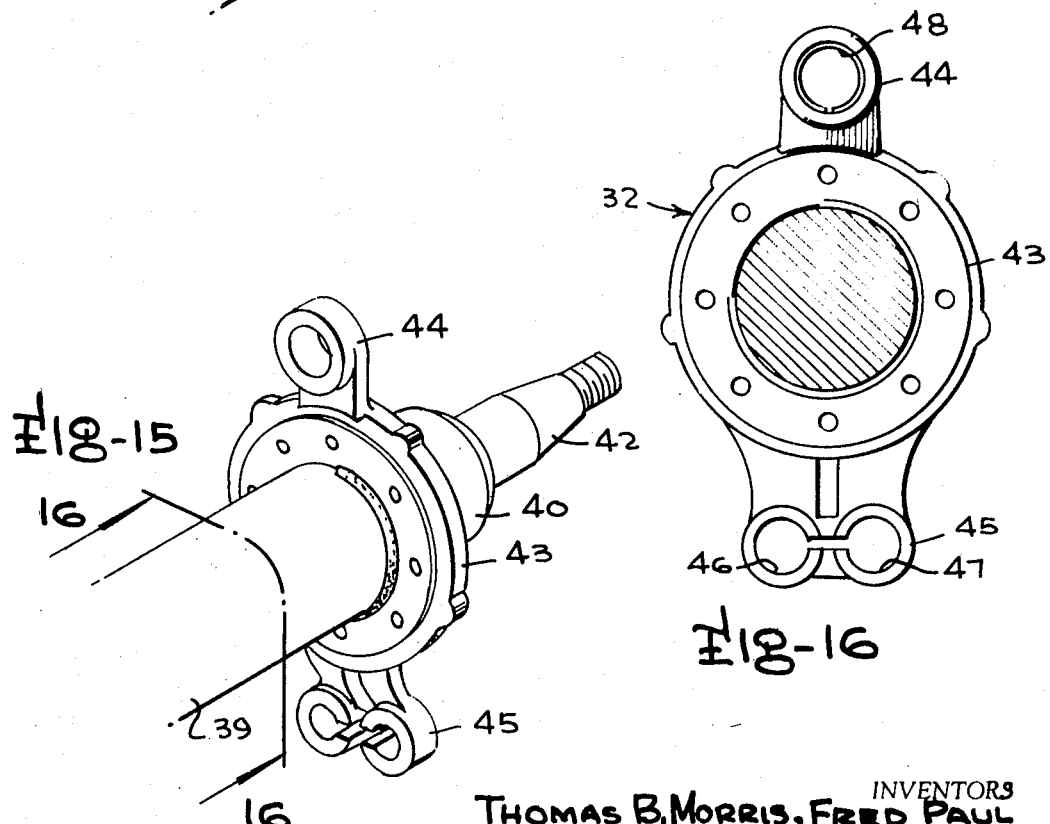

3,634,648

1

APPARATUS FOR WELDING FLANGES

This invention relates to a welding apparatus and more particularly to an apparatus for welding one or more flanges or brackets about the periphery of a cylindrical member, such as a mounting flange or brake spider on an axle shaft.

Conventional axles for trailers and similar vehicles generally consist of an axle having a pair of brake assemblies mounted on the ends thereof. The axle usually consists of a shaft provided with wheel spindles mounted on the ends thereof. Each brake assembly mounted on the axle generally includes a bracket commonly referred to in the art as a brake spider, rigidly mounted to the axle shaft adjacent a wheel spindle, a pair of anchor pins rigidly secured in openings provided in the lower end of the brake spider, and a pair of brake shoes pivotally mounted at the lower ends thereof on the anchor pins. A camshaft commonly is provided which is journaled at one end thereof in the upper end of the brake spider and at the opposite end thereof in a camshaft bracket rigidly secured to the axle shaft. The brake assembly also is provided with an actuating cam mounted on the outer end of the camshaft and between the free ends of the brake shoes, a spring interconnecting the upper ends of he brake shoes urging the upper ends thereof into engagement with the actuating cam, and a fluid-operated mechanism mounted on the axle shaft for rotating the camshaft to force the brake shoes apart and thus provide a braking action when the linings mounted on the table portions of the pair of brake shoes engage the brake drum of a wheel mounted on the wheel spindle of the axle.

In the manufacture of axles and particularly trailer axles, it has been a common practice in the industry to fabricate axles from tubular stock, generally by cutting the stock into a tubular shaft of desired length, press fitting the wheel spindles into the ends of the shaft and then welding the spindles to the shaft. After the spindles have been inserted into he ends of the axle shaft, either annular mounting flanges are welded to the axle shaft adjacent the end portions thereof, on which conventional brake spiders may be bolted, or a pair of brake spiders are welded directly onto the axle shaft. In securing the mounting flanges or brake spiders to the axle shaft, it has been the conventional practice in the industry to manually weld such flanges or brake spiders onto the axle shaft. Such practice, however, has been found to be both time consuming and inefficient, which has resulted in higher production costs.

Accordingly, it is the principal object of the present invention to provide a welding apparatus.

Another object of the present invention is to provide an apparatus for welding a flange or bracket about the periphery of a cylindrical member.

A further object of the present invention is to provide a novel apparatus for welding either a mounting flange or brake spider on an axle shaft.

A still further object of the present invention is to provide a novel apparatus for accurately positioning and welding a mounting flange or brake spider on an axle shaft.

Another object of the present invention is to provide a novel apparatus for positioning a mounting flange or brake spider about the periphery of an axle shaft and depositing beads of weld along the junctions of such a mounting flange or brake spider and the axle shaft.

A further object of the present invention is to provide a novel apparatus for welding a mounting flange or brake spider onto an axle shaft, which is rapid and efficient in operation.

A still further object of the present invention is to provide a novel apparatus for welding a mounting flange or brake spider onto an axle shaft which is simple in construction, comparatively easy to operate, and which requires minimum servicing.

Other objects and advantages of the present invention will become more apparent to those persons having ordinary skill in the art to which the invention pertains, from the following description taken in conjunction with the accompanying drawings, wherein:

FIG. 1 is a top plan view of an embodiment of the invention having an intermediate portion thereof broken away;

FIG. 2 is a side elevational view of the embodiment illustrated in FIG. 1, having an intermediate portion thereof broken away;

FIG. 3 is an enlarged side elevational view of a portion of the embodiment illustrated in FIG. 2;

FIG. 4 is a side elevational view of the opposite side of the view illustrated in FIG. 3;

FIG. 5 is an enlarged cross-sectional view taken along line 5—5 in FIG. 3;

FIG. 6 is a cross-sectional view taken along line 6—6 in FIG. 5;

FIG. 7 is an enlarged cross-sectional view taken along line 7—7 in FIG. 3;

FIG. 8 is an enlarged cross-sectional view taken along line 8—8 in FIG. 2;

FIG. 9 is a perspective view of an axle shaft, a mounting flange and a component of a fixture for positioning the mounting flange, illustrated in exploded relation;

FIG. 10 is a perspective view of an axle shaft, a mounting flange and a fixture component of the embodiment, illustrating the mounting flange positioned on the component;

FIG. 11 is a perspective view of an axle shaft having a mounting flange welded thereon;

FIG. 12 is an enlarged cross-sectional view taken along line 12—12 in FIG. 10;

FIG. 13 is an enlarged cross-sectional view taken along line 13—13 in FIG. 11;

FIG. 14 is a perspective view of an axle shaft and a brake spider, illustrated in exploded relation;

FIG. 15 is a perspective view of an axle shaft having a brake spider welded thereon; and FIG. 16 is an enlarged cross-sectional view taken along line 16—16 in FIG. 15.

Briefly described, the present invention relates to an apparatus for welding at least one flange about the periphery of a cylindrical member generally including a frame assembly, a pair of carrier assemblies mounted on the frame assembly for movement along a predetermined line of travel, a mounting assembly rotatably mounted on each of the carrier assemblies and engageable with the cylindrical member whereby the cylindrical member will be disposed coaxially relative to the common axis of rotation of the mounting assemblies, and means operatively engageable with the carrier means for urging the mounting assemblies into clamping relation with the cylindrical member whereby the cylindrical member is clamped between the mounting assemblies and the mounting assemblies and the cylindrical member are adapted to be rotated as an integral unit about the axis of the cylindrical member. Each of the mounting assemblies is provided with means for detachably securing a flange thereto in a predetermined position relative to the cylindrical member, welding means directed toward adjacent portions of a flange and the cylindrical member when the flange and cylindrical member are mounted on the mounting assembly for rotation therewith as an integral unit, means for rotating the mounting assembly with the flange and cylindrical members secured thereto, and means for energizing the welding means.

Referring to the drawings there is illustrated an embodiment of the invention. The embodiment includes a frame 20, a pair of longitudinally spaced support brackets 21 and 22 mounted on the frame, a pair of carriage assemblies 23 and 24 movably mounted on the frame, a pair of mounting assemblies 25 and 26 rotatably mounted on the carrier assemblies 23 and 24, a pair of welding assemblies 27 and 28 also mounted on the carrier assemblies and a drive assembly 29 mounted on the carrier assemblies and operatively connected to the mounting assemblies 25 and 26. The embodiment illustrated in FIGS. 1 through 9 may be operated to weld a pair of mounting flanges 30 onto the end portions of an axle shaft 31, as illustrated in FIGS. 9 through 13, or to weld a pair of brake spiders 32 onto an axle shaft 33, as illustrated in FIGS. 14 through 16. The axle 31 consists of a tubular shaft 34 having end portions 35 providing annular edges 36, and wheel spindles 37 which are inserted in the ends of the shaft 34. The annular flanges 30 have an inside diameter equivalent to the diameter of the end portions 35 of the shaft and are adapted to be secured to the shaft by means of weldments along the junctures of the mounting flanges and the shaft, as illustrated in FIGS. 11 and 13. Each of the mounting flanges 30 is provided with circumferentially spaced holes 38 for bolting a brake spider 32 to the axle.

FIGS. 14 through 16 illustrate a brake spider being welded directly onto the axle 33. The axle 33 is similar to the axle 31 and consists of a tubular shaft 39 having end portions 40 providing annular edges 41, and wheel spindles 42 inserted in the ends of the shaft. Each brake spider 32 consists of an annular portion 43 having an upper bracket portion 44 and a lower bracket portion 45. The inside diameter of the annular portion 43 is similar to an end portion 40 of the axle shaft. The brake spider is mounted on an end portion 40 of the axle shaft and is secured to the shaft by welding along the junctures of the annular portion of the brake spider and the axle shaft, as illustrated in FIGS. 15 and 16. The bracket portion 45 of the brake spider is provided with a pair of parallel openings 46 and 47 in which the anchor pins of the brake assembly are mounted. The upper bracket portion 44 also is provided with an opening 48 in which the outer end of a camshaft is journaled. As illustrated in FIG. 15, when the brake spider 32 is welded onto an end portion 40 of the axle shaft, the axes of the openings 46, 47 and 48 are disposed substantially parallel to the axis of the axle shaft.

The support brackets 21 and 22 mounted on the frame 20, are substantially identical in construction. Referring to FIG. 3, the support bracket is provided with a hydraulic cylinder 49 rigidly secured to the rear end thereof, having a cylindrical ram 50 journaled in an opening in the support bracket. The hydraulic cylinder 49 is provided with fluid lines 51 and 52 operatively connected to a source of fluid under pressure and a suitable control system for selectively extending or retracting the ram 50. As best illustrated in FIGS. 1 and 2, the rams of the support brackets 21 and 22 are axially aligned and the carriage assemblies 23 and 24 are secured to the rams for movement therewith when the rams are extended or retracted.

The carriage assemblies 23 and 24 also are substantially similar in construction and operation. The carriage assembly 24 is provided with a vertical side member 53, a horizontal transverse member 54 and a vertical side member 55. The vertical side member 53 includes a vertical section 56 having a lower inwardly projecting section 57 and an upper inwardly projecting section 58. The transverse member 54 includes a horizontal transverse section 59 having the lower edge thereof disposed at a level above the ram 50, an upper vertical section 60 rigidly secured to the inner edge of the vertical section 56 of members 53, by means of bolts 61, and a lower vertical section 62 secured at its lower end to the vertical side member 55. As best illustrated in FIG. 7, the inner edge of vertical section 62 and the inner side of vertical section 56 are spaced outwardly from the ram 50, and the vertical side members 53 and 55 are spaced outwardly relative to the axis of the ram 50 so that when the carriage 24 is retracted, the vertical side members 53 and 55 will clear the support bracket 24, as illustrated by the phantom lines in FIG. 3. In addition, the vertical side members 53 and 55 are provided with rollers 63 and 64 which are supported on a pair of transversely spaced, longitudinally disposed tracks 65 and 66 on the frame 20. As illustrated in FIGS. 1 and 2, the tracks 65 and 66 extend beyond the support brackets 21 and 22 to permit the vertical side sections of the carriage assemblies to travel alongside the support brackets 21 and 22.

Referring to FIG. 6, the ram 50 is provided with an axially disposed bore 67 in the front end thereof, which communicates with the hydraulic cylinder 49 by means of a restricted passageway 68. The front end of the bore 67 is closed by a threaded plug 69, in which there is journaled an axially disposed centering pin 70. The rearward end of the centering pin 70 is provided with a piston head 71 disposed in the chamber provided by the closed bore 67. The centering pin 70 is adapted to be moved forwardly when air under pressure is supplied to the rear end of the pneumatic cylinder 49 and flows through the restricted passageway 68 into the chamber of the closed bore 69, and is adapted to be retracted when fluid is supplied to the front end of the pneumatic cylinder 49 by means of a coil spring 72 interposed between the plug 69 and the piston head 71.

The ram 50 further is provided with a rigidly mounted collar 73 which also is secured to the vertical side section 62 of transverse member 54 so that when the ram 50 is extended or retracted, the carriage assembly 24 will correspondingly be extended and retracted. The mounting assembly 26 also is mounted on the front end of the ram 50 and is adapted to move with the ram 50 and the carriage 62 when the ram is extended and retracted.

The mounting assembly 26 is provided with a hub 73a which is mounted on a pair of bearings 74 and 75 seated on the ram 50 between the rigidly mounted collar 73 and a sleeve 76 rigidly secured on the front end of the ram 50. The forward end of the hub 73a is provided with an annular flange 77 to which there is rigidly secured a gear 78 disposed coaxially with the ram 50 and an annular mounting plate 79, by means of circumferentially spaced bolts 80.

Mounted on the annular mounting plate 79 is a fixture 81 which includes a rearwardly disposed arcuate section 82 rigidly secured to the mounting plate 79, a longitudinally projecting section 83 which is disposed in substantially spaced parallel relation to the axis of the ram 50, and a forwardly disposed arcuate section 84. The sections 83 and 84 are provided with parallel bearing surfaces 85 and 86 which are adapted to be engaged either by a brake spider 32, as shown in FIG. 14, when it is desired to weld a brake spider 32 directly onto an axle shaft 33, or an adapter 87, as illustrated in FIGS. 9, 10 and 11, when it is desired to weld an annular mounting flange 30 onto an axle shaft 31.

Referring to FIGS. 9, 10, and 12, the adapter 87 is similar in configuration to the brake spider 32 and includes an arcuate section 88 which is adapted to be disposed coaxially with the ram 50 when the adapter is mounted on the fixture 81, an upper bracket 89 which is adapted to engage the bearing surface 85 of the fixture, and a lower bracket 90 which is adapted to engage the bearing surface 86 of the fixture. The brackets 89 and 90 are provided with parallel holes 91, 92 and 93 which receive bolts 94 rigidly securing the adapter to the fixture 81. The front face of the arcuate section 88 of the adapter is provided with an arcuate recess 95 which is adapted to receive annular mounting flange 30 to position the flange relative to the axle shaft 31.

The adapter is provided with an aligning pin 96 which is adapted to register with one of the openings 38 in the flange to properly orient the holes 38 of the flange. The aligning pin 96 further is adapted to cooperate with a clamping device 97 which is pivotally connected to the upper bracket 89 for movement in a plane including the axis of the aligning pin 96. The clamping device has an arm member 98 pivotally connected to the bracket 89 and a cylindrical member 99 having an axis adapted to be aligned with the aligning pin 96 when the device has been moved to its lowermost position, as illustrated in FIG. 12. The cylindrical member 99 is provided with an axially disposed movable pin 100 having a collar 101, a spring interposed between the collar and the rear wall of the cylinder 99 and a cotterpin 102 mounted exteriorly relative to the rear wall of the cylinder 99 which operates to limit the forward travel of the pin 100. It will be appreciated that when it is desired to weld a mounting flange 30 on an axle shaft 31 and the adapter 87 is mounted on the fixture 81, the mounting flange 30 is positioned in the recess 95 so that the aligning pin 96 is received in one of the openings 38, and the clamping device 97 is lowered so that the movable pin 100 is inserted into the hole 38 and engages the aligning pin 96, as illustrated in FIGS. 10 and 12.

Bolted to the forwardly disposed surface 103 of the arcuate section 82 of the fixture is an annular mounting plate 104 which is disposed coaxially with the ram 50. Adapted to be detachably mounted in the opening in the mounting plate 104 is a spacing sleeve 105 having a reduced end portion 106 receivable within the opening in the mounting flange 104, an annular flange 107 which engages the forwardly disposed surface of the mounting plate, and a forwardly disposed annular edge 108 which is adapted to engage the annular surfaces 36 and 41 of the axle shafts 31 and 33 when the shafts are mounted in the apparatus and the ram 50 is extended to move the carriage assembly 24 and mounting assembly 26 forwardly. The inside diameter of the sleeve 105 is greater than the greatest outside diameter of a spindle 37 or 42, so that a spindle received therein may be centered and guided to engage the pointed end 70a of the centering pin 70 mounted in the forward end of the ram 50. It is contemplated that a number of sleeves 105 having different lengths will be used to accommodate axles of different sizes. It further is contemplated that the axial dimensions between the parallel planes including the annular edge 108 of the sleeve 105, and surfaces 85 and 86 of the fixture 81, will be predetermined to accurately position a mounting flange 30 relative to the axle shaft 31 when the adapter 87 is mounted on the front end of the fixture 81, and a spider 32 will be accurately positioned relative to an axle shaft 33 when the brake spider 32 is mounted directly on the front end of the fixture 81.

The mounting flange 30 and the brake spider 32 are secured to the front end of the fixture 81, as described, by means of a clamping unit including a pneumatic cylinder assembly 109 and a link assembly 110. The pneumatic cylinder assembly includes a pneumatic cylinder 111 rigidly secured on the fixture 81, and a rearwardly projecting ram 112 which is disposed substantially parallel to the axis of ram 50. As best illustrated in FIG. 6, the air supply circuit for the pneumatic cylinder 111 includes a fluid line 113 connected to a source of air under pressure, an internal passageway 114 in flange 73, the openings in bearing 75, the annular passageway 115 disposed between the hub 73 and the ram 50, an internal passageway 116 in the hub 73, a fluid line 173, a passageway 118 in the gear 78, a fluid line 119, a two-way valve 120 rigidly secured to the fixture 81, a fluid line 129 connected to the rear end of the cylinder 111, and a fluid line 122 connected to he front end of the cylinder 111. It will be seen that by operating the two-way valve 120, fluid under pressure will be supplied selectively either to the front or rear ends of the cylinder 111, to extend or retract the ram 112.

Referring to FIGS. 4 and 5, the link assembly 110 consists of a pair of pivot pins 113 and 114, a pair of crank arms 115 and 116, an interconnecting link 117 and an L-shaped link 118. As best illustrated in FIG. 5, the axes of the pivot pins 113 and 114 are parallel and lie in spaced parallel planes disposed perpendicular to the axis of the ram 50. The pin 113 is journaled in a pair of spaced brackets 119 and 120 which are rigidly secured to the fixture 81 by several bolts. Rigidly secured to the pivot pin 113 between the brackets 119 and 120, for pivotal movement therewith, is a clamp member 121. The pivot pin 114 is journaled in a pair of brackets 122 and 123 which are bolted to the fixture 81. A clamp 124 is rigidly secured to the pivot pin 114 for pivotal movement therewith, between the brackets 122 and 123.

The clamp members 121 and 124 substantially are diametrically opposed relative to the axis of the ram 50. As illustrated in FIGS. 5 and 6, when the adapter 87 is mounted on the fixture 81 and it is desired to position the flange 30 relative to the axle 31 mounted in the apparatus, the pin 113 may be pivoted to pivot the clamping member 121 into engagement with the arm member 98 of the clamping device 97 to urge the clamping device into clamping relation with the adapter. The mounting flange 30 is then firmly positioned relative to the shaft 31 for welding. When the adapter 87 has been removed from the fixture 81 and it is desired to weld a brake spider 32 onto a shaft 33, the brake spider is positioned against the bearing surfaces 85 and 86 of the fixture and the clamp members 121 and 124 are pivoted into clamping engagement with the upper and lower bracket sections 44 and 45 of the brake spider.

The crank arms 115 and 116 are rigidly secured to the pivot pins 113 and 114, and have the free ends thereof interconnected by the link 117. As best illustrated in FIGS. 4 and 5, the free end portions of the crank arms 115 and 116 are provided with pivot pins 125 and 126 which are received in a pair of aligned slots 127 and 128 in the interconnecting link 117. The L-shaped link 118 is supported on the fixture 81 by means of a pair of pins 129 and 130 which extend through a pair of aligned slots 131 and 132 in the longitudinally disposed section 133 of the link 118. The free end of the section 133 is pivotally connected to the interconnecting member 117 by means of a pin 134. As shown in FIG. 4, the L-shaped link 118 also has a leg portion 135 which is rigidly secured to the free end of the ram 112.

It thus will be seen that by operating the pneumatic cylinder assembly 109 to extend and retract the ram 112, the L-shaped link will reciprocate and transmit motion to the interconnecting link 117 to pivot the crank arms 115 and 116. Correspondingly, the pivot pins 113 and 114 will be pivoted to move the clamp members 121 and 124 into clamping engagement with the brackets 44 and 45 of a brake spider 32, or to move the clamp member 121 into clamping engagement with the arm member 98 of the clamping device 97 when the adapter 87 is mounted on the fixture 81.

The mounting assemblies 25 and 26 are rotated about a common axis by means of the drive assembly 29. Referring to FIGS. 1, 7 and 8, the drive assembly 29 includes a motor 136 which transmit drive through an electrically operated clutch and brake unit 137 to a telescopic shaft 138 disposed parallel to the axis of rotation of the mounting assemblies 25 and 26. The motor 136 and the clutch and brake unit 137 are mounted on a bracket 139 which is an integral component of the carriage assembly 53a. As best illustrated in FIG. 1, the telescopic shaft section 138a is journaled in a bracket 140 mounted on the support bracket 139 and the telescopic shaft section 138b is journaled in a bracket 55a formed integral with the vertical side member 55. Drive is transmitted from the shaft section 138b to rotate the mounting assembly 26 on the ram 50 by means of a gear train including drive gear 141 mounted on the shaft section 138b, idler gear 142 mounted on a stub shaft journaled in the bracket 55a, and driven gear 78 rigidly secured to the hub 73 of mounting assembly 26. Similarly, drive is transmitted to the mounting assembly 25 by means of a gear train consisting of a drive gear 143 mounted on the shaft section 138a, idler gear 144 mounted on a stub shaft journaled in the bracket 139 and driven gear 78a mounted on the mounting assembly 25. It will be seen that when the motor 136 is operated, and the clutch of the unit 137 is engaged, drive will be transmitted from the telescopic shaft 138 through the two gear trains to rotate the mounting assemblies 25 and 26 simultaneously. The telescopic shaft 138 further permits the carriage assemblies 23 and 24 to be moved toward and away from each other when the rams 50 and 50a are extended and retracted.

The welding assemblies 27 and 28 are substantially similar in construction and operation. Referring to FIG. 3, the welding assembly 28 is mounted on a mounting bar 145 which is supported at one end in the upper vertical section 60 of the transverse member 54, and is supported intermediate the ends thereof in a bracket 146 depending from the upper projecting section 58 of the side member 53. The mounting bar 145 is disposed parallel to the axis of the ram 50 and is laterally offset from the vertical plane including the axis of the ram 50. Mounted on the bar 145 between the depending bracket 146 and the transverse member 54 is a clamp 147 which may be positioned along the length of the bar. The clamp 147 is provided with a laterally extending rod 148, as best illustrated in FIG. 5, on which there is mounted a clamp 149 having a downwardly and forwardly projecting mounting rod 150. The mounting rod 150 supports a clamp 151 which carries a downwardly and forwardly projecting gun type welding head 152, as best illustrated in FIG. 3. It will be noted that the clamps 147, 149 and 151 can be adjusted to direct the firing end of the welding head 152 toward the juncture of a flange 30 and an axle 31 mounted in the apparatus. It further will be noted that when the adapter 87 is removed and it is desired to weld a brake spider 32 onto an axle shaft 33, the position of the welding head 152 can be adjusted so that the firing end thereof is directed to the juncture of a brake spider mounted on the fixture 81 and an axle shaft mounted in the apparatus.

Mounted on the end portion of the mounting bar 145 is a clamp 153 having a transversely projecting mounting bar 154. A clamp 155 is mounted on the bar 154, which supports a pneumatic cylinder 156 having a downwardly and rearwardly movable piston 157. The end of the piston 157 is provided with a radially projecting arm 158 to which there is connected an adjustable clamp 159 supporting a downwardly and rearwardly gun-type welding head 160 disposed substantially parallel to the piston 157. The pneumatic cylinder 156 is connected to a fluid supply system having appropriate controls, so that the piston 157 can be extended to position the firing end of the welding head 160 adjacent the juncture of a mounting flange 30 mounted on an axle shaft 31 positioned in the apparatus, and to retract the piston 157 to correspondingly retract the welding head 160, thus providing the operator access to the front end of the fixture 81. It will be appreciated that when the welding heads are positioned as illustrated in FIG. 6, they may be energized to deposit beads of weld along the junctures of the mounting flange 30 and the axle shaft 31 as the mounting assembly 56 is rotated, to secure the mounting flange to the axle shaft.

When it is desired to weld a pair of mounting flanges onto an axle shaft 31, certain controls of the pneumatic system for the rams 50 and 50a are actuated to retract the carriage assemblies 23 and 24. The mounting assemblies 25 and 26, and the welding assemblies 27 and 28 are then set up to accommodate the components to be welded together by mounting the sleeves 105 of the proper size on the fixtures 81, securing the adapters 87 on the fixtures, and adjusting the positions of the welding heads 152 and 160 so that when the welding head 160 is extended, the firing ends of the welding heads 152 and 160 will be disposed adjacent the junctures of the mounting flange 30 clamped to the fixture, and the axle shaft 31. With the mounting and welding assemblies thus assembled and adjusted, an axle shaft 31 having a pair of mounting flanges 30 loosely mounted on the ends thereof, is manually inserted into the apparatus by rolling the axle shaft on a pair of spaced, transversely disposed rails 161 and 162 supported on the frame 20. The shaft 31 is positioned on the rails 161 and 162 in axial alignment with the rams 50 and 50a. The mounting flanges 30 are then manually positioned in the arcuate recesses 95 of the adapters 87, so that each aligning pin 96 of an adapter is received in a hole 38 of a mounting flange. The air valve 120 is then operated to supply air under pressure to the pneumatic cylinder assemblies 109 which operate the link assemblies 110 to move the clamping devices 97 into engagement with the mounting flanges positioned on the adapters.

Appropriate controls of the pneumatic supply system are then actuated to supply air under pressure to the rear ends of the pneumatic cylinders for the rams 50 and 50a, thus causing the rams to extend toward each other. As air under pressure is supplied to the pneumatic cylinders for the rams, portions of the pressurized air flow through the restricted passageways 68 of the rams into the chambers of the closed bores 60 to extend the centering pins 70 and cause the pointed ends 70a thereof to be inserted in centering recesses provided in the ends of the spindles 37 of the axle. As the rams are extended, the carriage assemblies 23 and 24 also move inwardly relative to the axle, thus causing the annular edges 108 of the sleeves 105 to engage the annular edges 36 of the axle shaft to clamp the axle between the mounting assemblies 25 and 26. The inward travel of the carriage assemblies further operates to position the mounting flanges 30 relative to the axle shaft, as illustrated in FIG. 6.

With the axle shaft firmly clamped between the mounting assemblies and the mounting flanges 30 positioned relative to the axle shaft, the welding cycle is initiated whereby the movable welding heads 60 move into position so that the welding heads 152 and 160 of each welding assembly are positioned on opposite sides of a mounting flange adjacent the junctures of the mounting flange and the axle shaft. When the welding heads 160 are in their maximum extended position ready to weld, the clutch and brake unit 137 is energized to engage the clutch thereof and transmit forward drive from the motor 136 to the drive shaft 138. The drive is transmitted through the gear trains to rotate the mounting assemblies 25 and 26 and the axle clamped therebetween as an integral unit. Simultaneously, the supply circuit for the welding head is energized to deposit beads of weld along the junctures of the mounting flanges and the axle shaft. The welding operation continues for approximately three-quarters of a forward revolution, whereupon, an abutment 163 mounted on the driven gear 78a engages and actuates a limit switch 164 mounted on the carriage assembly 23. When the limit switch 164 is actuated, the clutch of the unit 137 is disengaged and the brake thereof is applied as the drive motor 136 is placed in the reverse mode. Simultaneously, the actuation of the limit switch 163 energizes a circuit, causing the welding heads 160 to retract until they both engage full retracted limit switches.

As soon as the welding heads 160 are fully retracted, the clutch of the unit 137 engages, and the shaft 138 rotates in reverse at full speed until a full reverse limit switch is engaged. At this point, the clutch of the unit 137 is disengaged, the brake thereof is applied, the reversing action of the drive is stopped, and the welding cycle is ready to commence again. The valve 120 is manually operated to unclamp the mounting flanges 30, and appropriate controls for the pneumatic cylinders for the rams 50 and 50a are operated to retract the rams and thus free the axle. The welded axle is then removed from the apparatus by rolling it along the rails 161 and 162 until it is clear of the carriage assemblies 23 and 24.

The procedure for welding a pair of brake spiders 32 onto an axle shaft 39 is similar to the procedure as described above. In setting up the mounting assemblies for clamping the brake spiders to the fixtures thereof, the adapters 97 are removed, so that when the brake spiders are mounted on the fixtures 81, the brackets 44 and 45 thereof will engage the bearing surfaces 85 and 86 of the fixtures and be clamped thereto by the clamp members 121 and 124. It will be noted that when the rams 50 and 50a engage an axle shaft mounted in the apparatus, and the clutch of the unit 137 is engaged to transmit drive to the driven gears 78 and 78a, the mounting assemblies, the axle shaft clamped between the mounting assemblies and the mounting flanges 30 or the brake spiders 32 clamped to the fixtures of the mounting assemblies, will be rotated as an integral unit to permit the mounting flanges or the brake spiders to be welded to the axle shaft by the stationary welding heads. Once the axle components have been mounted in the apparatus and the welding cycle has been initiated, the entire welding operation is automatic.

As previously indicated, the spindles of the axles are inserted into the axle shafts by press fitting the inner ends thereof into the ends of the axle shaft. The spindles further are secured to the axle shaft by welding. It has been the common practice in the industry to weld the spindles manually. It is contemplated, however, that such welding operation can be performed by the present invention by mounting additional welding assemblies on the mounting bars 145 and 145a having gun-type welding heads directed to the peripheral junctures of the ends of the axle shafts and the spindles.

It will be noted that the embodiment illustrated in the drawings is provided with a ground assembly 160 which includes an electrically conducting ring 161 mounted on the hub 73a, a mounting bracket 162 secured to the collar 73, and a set of brushes 163, in sliding contact with the rotatable ring 16. The set of brushes is electrically insulated from the frame assembly and is provided with an electrical line 164 which functions to connect the welding heads 152 and 160 through the axle 31, the mounting head assembly 26, the ring 160 and brushes 163, to ground.

From the foregoing detailed description it will be evident that there are a number of changes, adaptations and modifications of the present invention which will come within the province of those skilled in the art. However, it is intended that all such variations not departing from the spirit of the invention be considered as within the scope thereof as limited solely by the appended claims.

We claim:

1. An apparatus for welding a flange about the periphery of a cylindrical member comprising a frame assembly, a carriage assembly mounted on said frame assembly for movement along a predetermined line of travel toward and away from a cylindrical member positioned within the apparatus, a mounting assembly rotatably mounted on said carriage assembly and engageable with said cylindrical member whereby said cylindrical member will be disposed coaxially relative to the axis of rotation of said mounting assembly, means mounted on said frame assembly operatively engageable with said carriage assembly for advancing said carriage assembly and urging said mounting assembly thereon into clamping relation with said cylindrical member whereby said mounting assembly and said cylindrical member are secured together and adapted to be rotated as an integral unit about the axis of said cylindrical member, said mounting assembly having means for detachably securing said flange thereto in a predetermined position relative to said cylindrical member, welding means mounted on said carriage assembly, directed toward adjacent portions of said flange and cylindrical member when said flange and cylindrical members are mounted on said mounting assembly for rotation therewith as an integral unit, means for rotating said mounting assembly with said flange and cylindrical members secured thereto and means for energizing said welding means.

2. An apparatus for welding a flange about the periphery of a cylindrical member according to claim 1, wherein said means for detachably securing said flange to said mounting assembly in a predetermined position relative to said cylindrical member comprises clamping means.

3. An apparatus for welding a flange about the periphery of a cylindrical member according to claim 1, wherein said frame assembly includes an abutment member engageable with a portion of said cylindrical member, said mounting assembly includes an abutment surface engageable with a portion of said cylindrical member and said means for urging said mounting assembly into clamping engagement with said cylindrical member comprises a fluid-operated means engageable with said carriage assembly for clamping said cylindrical member between said abutment surface of said mounting assembly and said abutment surface of said frame assembly.

4. An apparatus for welding a flange about the periphery of a cylindrical member according to claim 1, wherein said means for securing said flange to said mounting assembly in a predetermined position relative to said cylindrical member comprises an abutment surface provided on said mounting assembly on which said flange may be positioned and fluid-operated means disposed on said mounting assembly for clamping said flange on said abutment surface.

5. An apparatus for welding a flange about the periphery of a cylindrical member according to claim 1, wherein said frame assembly includes an abutment member engageable by a portion of said cylindrical member, said mounting assembly includes a first abutment surface engageable with a portion of said cylindrical member, said means for urging said mounting assembly into clamping engagement with said cylindrical member comprises a fluid-operated means engageable with said carrier assembly for clamping said cylindrical member between said first abutment surface of said mounting assembly and said abutment member of said securing said flange to said mounting assembly in a predetermined position relative to said cylindrical member comprises a second abutment surface provided on said mounting assembly on which said flange may be positioned and fluid-operated means disposed on said mounting assembly for clamping said flange on said second abutment surface.

6. An apparatus for welding a flange about the periphery of a cylindrical member according to claim 1, wherein said mounting assembly is provided with different abutment surfaces to accommodate flanges of different sizes or configurations.

7. An apparatus for welding a flange about the periphery of a cylindrical member according to claim 1, wherein said welding means comprise a pair of gun-type welding heads, each disposed on a side of said flange and directed toward adjacent portions of said flange and cylindrical member to deposit a bead of weld along the junctures of said flange and cylindrical member.

8. An apparatus for welding a flange about the periphery of a cylindrical member according to claim 7, wherein at least one of said welding heads is retractable to permit the positioning of said flange on said mounting means.

9. An apparatus for welding at least one flange about the periphery of a cylindrical member comprising a frame assembly, first and second carrier assemblies mounted on said frame assembly for movement along a predetermined line of travel toward and away from each other, a mounting assembly rotatably mounted on each of said carrier assemblies and engageable with said cylindrical member therebetween whereby said cylindrical member will be secured between said mounting assemblies coaxially relative to the common axis of rotation of said mounting assemblies, means mounted on said frame assembly operatively engageable with said carrier assemblies for urging said mounting assemblies into clamping relation with said cylindrical member whereby said cylindrical member is clamped between said mounting assemblies and said mounting assemblies and said cylindrical member are adapted to be rotated as an integral unit about the axis of said cylindrical member, at least one of said mounting means having means for detachably securing a flange thereto in a predetermined position relative to said cylindrical member, welding means mounted on at least one of said carrier assemblies, directed toward adjacent portions of said flange and said cylindrical member when the flange and the cylindrical member are mounted on said mounting means for rotation therewith as an integral unit, means for rotating said mounting means with said flange and cylindrical member secured thereto and means for energizing said welding means.

10. An apparatus according to claim 9, wherein said means for detachably securing said flange to said mounting assembly in a predetermined position relative to said cylindrical member comprises clamping means.

11. An apparatus for welding at least one flange about the periphery of a cylindrical member according to claim 9, wherein each of said mounting assemblies includes an abutment surface engageable with a portion of said cylindrical member and said means operatively engageable with said carrier assemblies for urging said mounting assembly into clamping relation with said cylindrical member comprises a fluid-operated means engageable with said carrier assemblies for clamping said cylindrical member between said abutment surfaces.

12. An apparatus for welding at least one flange about the periphery of a cylindrical member according to claim 9, wherein said means for securing said flange to said mounting assembly in a predetermined position relative to said cylindrical member comprises an abutment surface provided on said mounting assembly on which said flange may be positioned and fluid-operated means disposed on said mounting assembly for camping said flange on said abutment surface.

13. An apparatus for welding at least one flange about the periphery of a cylindrical member according to claim 9, wherein said mounting assemblies include abutment surfaces engageable with portions of said cylindrical member, said means for urging said mounting assemblies into clamping relation with said cylindrical member comprise fluid-operated means engageable with said carrier assemblies for clamping said cylindrical member between said abutment surfaces of said mounting assemblies, and wherein said means for securing said flange to said mounting assembly in a predetermined position relative to said cylindrical member comprises a second abutment surface provided on said mounting assembly on which said flange may be positioned and fluid-operated means disposed on said mounting assembly for clamping said flange on said second abutment surface.

14. An apparatus for welding at least one flange about the periphery of a cylindrical member according to claim 9, wherein said mounting assembly is provided with different abutment surfaces to accommodate flanges of different sizes or configurations.

15. An apparatus for welding at least one flange about the periphery of a cylindrical member according to claim 9, wherein said welding means comprise a pair of gun-type welding heads, each disposed on a side of said flange and directed toward adjacent portions of said flange and cylindrical member to deposit a bead of weld along the junctures of said flange and cylindrical member.

16. An apparatus for welding at least one flange about the periphery of a cylindrical member according to claim 15, wherein at least one of said welding heads is retractable to permit the positioning of said flange on said mounting means.

17. An apparatus for welding a pair of flanges about the periphery of a cylindrical axle having reduced end portions providing annular surfaces disposed substantially normal to the axis of said axle comprising a frame, first and second support units rigidly mounted on said frame in longitudinally spaced relation, axially aligned rams mounted on said support units, means for selectively extending and retracting said rams, a carrier assembly secured to each of said rams for movement therewith, a mounting assembly rotatably mounted on each of said carrier assemblies, each of said mounting assemblies having an axis of rotation disposed coaxially relative to the axis of said rams, said mounting assemblies having abutment surfaces engageable in clamping relation with the shoulder portions of said axle when said axle is axially aligned with said rams and said rams are extended, each of said mounting assemblies having means for securing one of said flanges thereto in predetermined position relative to said axle, welding means mounted on each of said carrier assemblies, directed toward adjacent portions of said axle and flange secured to said mounting assemblies for rotation as an integral unit, means for rotating said mounting assemblies and means for energizing said welding means.

18. An apparatus for welding a pair of flanges about the periphery of a cylindrical axle having reduced end portions providing annular surfaces disposed substantially normal to the axis of said axle according to claim 17, wherein said means for detachably securing said flange to said mounting assembly in a predetermined position relative to said cylindrical member comprises clamping means.

19. An apparatus for welding a pair of flanges about the periphery of a cylindrical axle having reduced end portions providing annular surfaces disposed substantially normal to the axis of said axle according to claim 17, wherein said means for securing said flange to said mounting assembly in a predetermined position relative to said cylindrical member comprises an abutment surface provided on said mounting assembly on which said flange may be positioned and fluid-operated means disposed on said clamping assembly for clamping said flange on said abutment surface.

20. An apparatus for welding a pair of flanges about the periphery of a cylindrical axle having reduced end portions providing annular surfaces disposed substantially normal to the axis of said axle according to claim 17, wherein said mounting assembly is provided with different abutment surfaces to accommodate flanges of different sizes or configurations.

21. An apparatus for welding a pair of flanges about the periphery of a cylindrical axle having reduced end portions providing annular surfaces disposed substantially normal to the axis of said axle according to claim 17, wherein said welding means comprise a pair of gun-type welding heads, each disposed on a side of said flange and directed toward adjacent portions of said flange and cylindrical member to deposit a bead of weld along the junctures of said flange and cylindrical axle.

22. An apparatus for welding a pair of flanges abut the periphery of a cylindrical axle having reduced end portions providing annular surfaces disposed substantially normal to the axis of said axle according to claim 21, wherein at least one of said welding heads is retractable to permit the positioning of said flange on said mounting means.

23. An apparatus for welding a pair of flanges about the periphery of a cylindrical axle having reduced end portions providing annular surfaces disposed substantially normal to the axis of said axle according to claim 17, wherein said mounting assembly includes a guide sleeve disposed coaxially with said ram for receiving a reduced end portion of said axle therethrough and said abutment surface of said mounting assembly comprises an annular surface of said guide sleeve which engages an annular portion of said axle when the adjacent reduced portion of said axle is received within said guide sleeve.

24. An apparatus for welding a pair of flanges about the periphery of a cylindrical axle having reduced end portions providing annular surfaces disposed substantially normal to the axis of said axle according to claim 17, wherein said mounting assembly includes a base section rotatably mounted on said carrier assembly, a support section projecting longitudinally and being spaced radially relative to the axis of said rams and an arcuately shaped section disposed substantially normal and coaxially with the axis of said rams, secured to the free end of said support section, and wherein said abutment surface on which said flange is positioned relative to said axle is disposed on a front face of said arcuately shaped section.

25. An apparatus for welding a pair of flanges about the periphery of a cylindrical axle having reduced end portions providing annular surfaces disposed substantially normal to the axis of said axle according to claim 17, wherein said mounting assembly includes a base section rotatably mounted on said carrier assembly, a support section projecting longitudinally and being spaced radially relative to the axis of said rams and an arcuately shaped section disposed coaxially with the axis of said rams, secured to the free end of said support section, said abutment surface on which said flange is positioned relative to said axle is disposed on a front face of said arcuately shaped section, and said mounting assembly includes a guide sleeve secured to said support section and disposed coaxially with said rams for receiving a reduced end portion of said axle therethrough and said abutment surface of said mounting assembly engageable with said axle comprises an annular surface of said guide sleeve which engages an annular portion of said axle when the adjacent reduced portion of said axle is received within said guide sleeve.

26. An apparatus for welding a pair of flanges about the periphery of a cylindrical axle having reduced end portions providing annular surfaces disposed substantially normal to the axis of said axle according to claim 25, wherein said welding means comprise a pair of gun-type welding heads, each disposed on a side of said flange positioned relative to said axle, and directed toward adjacent portions of said flange and axle to deposit a bead of weld along the junctures of said flange and axle.

* * * * *